J. B. NEWLAND.
Wagon-Jack.
No. 206,746.  Patented Aug. 6, 1878.
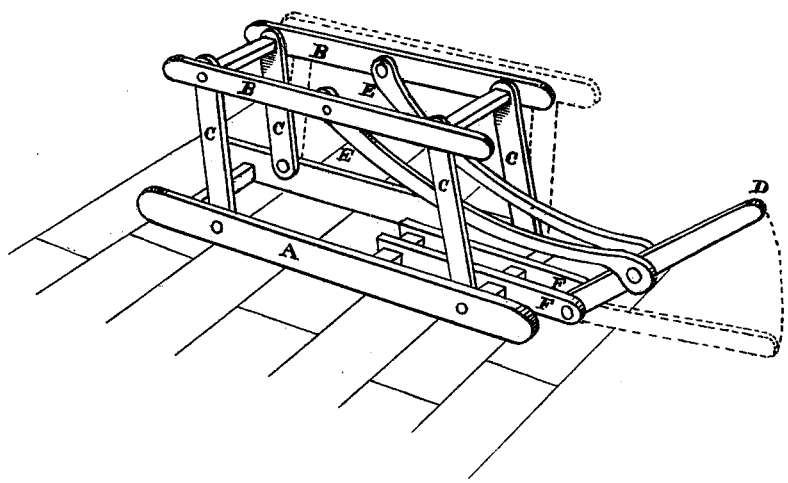
Witnesses
Jno. L. Boone
Frank A. Brooks
Inventor
James B. Newland
by Dewey & Co.
Attys.

UNITED STATES PATENT OFFICE.

JAMES B. NEWLAND, OF SACRAMENTO, CALIFORNIA.

IMPROVEMENT IN WAGON-JACKS.

Specification forming part of Letters Patent No. 206,746, dated August 6, 1878; application filed June 22, 1878.

*To all whom it may concern:*

Be it known that I, JAMES B. NEWLAND, of the city and county of Sacramento, and State of California, have invented an Improved Wagon-Jack; and I do hereby declare the following to be a full, clear, and exact description thereof, reference being had to the accompanying drawings.

My invention relates to an improved jack for raising and supporting the end of a wagon or carriage when a wheel is to be removed or repaired, and for other similar purposes.

Reference is had to the accompanying drawing, in which the figure is a perspective view.

My improved wagon-jack consists of two horizontal frames, A B, which are connected together by a link, C, at each corner, so that the two frames will have a parallel motion. The upper frame is raised and lowered by means of a lever, D, and connecting-bars E E.

The lower or base frame, A, is large enough to have a firm solid bearing upon the ground. The lever D has its lower end secured between hounds F F at one end of the lower frame, and the connecting-rods E E are attached to it near its middle, while their opposite ends are attached to the upper frame, B, near its middle, so that by drawing the upper end of the lever forward and forcing it down to a horizontal position the frame B is raised with a parallel motion.

In use the closed frame is placed under the axle of the wagon or carriage, and the upper frame is raised by means of the lever, so as to lift the carriage or wagon wheels clear of the ground, a single operation serving to lift the entire end of the wagon or carriage and free both wheels.

Having described my invention, what I claim, and desire to secure by Letters Patent, is—

A wagon-jack consisting of the horizontal frames A B, connected together by links C, and operated by the lever D and connecting-bar E E, substantially as above described.

In witness whereof I have hereunto set my hand and seal.

JAMES BEAN NEWLAND. [L. S.]

Witnesses:
 FRANK G. WATERHOUSE,
 P. BOHL.